United States Patent
Schwartzman

[11] 3,805,540
[45] Apr. 23, 1974

[54] INTEGRATED ENERGY-CONVERSION SYSTEM

[76] Inventor: Everett H. Schwartzman, 724 Cloyden Rd., Palos Verdes Estates, Calif. 90274

[22] Filed: June 2, 1972

[21] Appl. No.: 259,066

[52] U.S. Cl............... 62/238, 62/243, 62/244, 62/323
[51] Int. Cl............................................ F25b 27/02
[58] Field of Search ............. 62/238, 243, 244, 323

[56] References Cited
UNITED STATES PATENTS
3,623,333  11/1971  Swenson, Jr. ............... 62/238 X
3,289,747  12/1966  Harris ........................... 62/238 X Primary Examiner—Meyer Perlin
Assistant Examiner—Ronald C. Capossela
Attorney, Agent, or Firm—Nilsson, Robbins & Berliner

[57] ABSTRACT

A system is disclosed incorporating a combustion heat engine, mechanically coupled to drive an electrical generator and heat-transfer coupled to drive a refrigeration means, with appropriate control structure. The mechanical energy of the engine is employed for the generation of electrical energy while the heat of the engine (normally wasted) is applied to drive a refrigeration structure or alternatively to provide space heat. As disclosed, heat is transferred from the engine to the refrigeration system or the space heater by a fluid-flow circuit and control is provided by a pump in that circuit along with a temperature-responsive throttle valve.

9 Claims, 3 Drawing Figures

PATENTED APR 23 1974　　　　　　　　　　　　　3,805,540

INTEGRATED ENERGY-CONVERSION SYSTEM

BACKGROUND AND SUMMARY OF THE INVENTION

The need frequently arises to accomplish various energy conversions, as for improving the environment of living quarters. For example, travel trailers, motor homes and other units are frequently designed for operation independent of any external power source while stationary as well as moving. In those vehicles that include a prime motive engine, that engine is sometimes employed for accomplishing electrical power, space heating and space cooling (air conditioning). Although such arrangements sometimes deter from the performance of the engine to propel the vehicle, a more serious problem arises when the vehicle is used while immobile. In such a situation, it is impractical to operate the primary engine to accomplish auxiliary functions. Consequently, an engine-propelled vehicle, e.g. motor home, presents problems that are generally similar to those of a travel trailer in relation to the provision of environmental services.

Pursuing the selected examples, motor homes and travel trailers, in many instances have been equipped with auxiliary internal-combustion engines to provide environmental service. Specifically, in one conventional arrangement, the auxiliary engine is mechanically coupled to an electrical generator for the provision of electrical energy, the major portion of which is provided to drive an air-conditioning system. Space heat may then be provided from a fuel burner. Such an arrangement presents several inherent problems. First, conventional forms of the engine produce a considerable amount of heat while generating energy for the air-conditioning system, and that heat tends to leak into the space being air conditioned, thereby nullifying a portion of the air conditioning. Additionally, an engine with a capacity to adequately drive an electrical air-conditioning system in addition to the other traditional appliances, is generally of a size that presents substantial problems of noise, vibration, weight, and fuel consumption. Further, such prior systems, involving several separate items of equipment have been quite costly. Consequently, a need exists for an improved integrated energy-conversion system for providing environmental services (electricity, heat and cooling) without the disadvantages of conventional systems as considered above.

Generally, the present invention is directed to an energy-conversion system which utilizes a heat engine, e.g. an internal-combustion engine, and wherein both the mechanical energy and heat energy of such an engine are effectively used. Specifically, the mechanical energy from the engine drives an electrical generator while the normally-wasted heat energy serves either a space heater or a space cooler (air conditioner) incorporating a heat-powered refrigeration system. In general, the present system incorporates control techniques whereby various environmental services may be efficiently provided in accordance with specific existing conditions.

BRIEF DESCRIPTION OF THE DRAWINGS

In the drawings, which constitute a part of the specification, exemplary embodiments exhibiting various objectives and features hereof are set forth, specifically.

DESCRIPTION OF THE ILLUSTRATIVE EMBODIMENT

As required, a detailed illustrative embodiment of the invention is disclosed herein. The embodiment exemplifies the invention which may, of course be embodied in other forms, some of which may be radically different from the illustrative embodiment as disclosed. However, the specific structural details disclosed herein are representative and they provide a basis for the claims which define the scope of the present invention.

Figure 1:
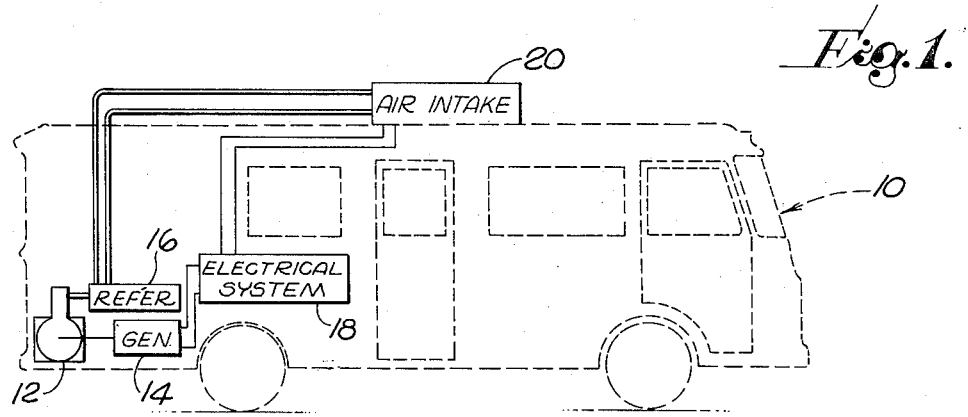
FIG. 1 is a diagrammatic presentation of a system constructed in accordance with the present invention.

Referring initially to FIG. 1, a mobile unit 10 is represented in phantom, which unit may comprise a travel trailer, motor home, or alternatively may take the form of any living space as in the form of a boat or remote cabin that is isolated from an external source of power. The system of the present invention is applicable to the unit 10 to provide environmental services with convenience, efficiency and at a reasonable cost.

Generally, the basic power source of the illustrative system is an engine 12 which is mechanically coupled to a generator 14 and connected to a refrigerator system 16 through a heat-transfer apparatus (not shown). The generator 14 actuates an electrical system 18 which may provide energy for various applicances, e.g. radio, television, kitchen accessories, lights and so on. The refrigeration unit 16 supplies either hot or cold working fluid to an air-intake system 20, which accordingly may provide either warm or cool air to the interior of the unit 10, depending upon ambient conditions.

Due to the fact that a major portion of the heat developed by the engine 12 is utilized by the refrigerator 16, a relatively small quantity of heat (at a relatively low temperature) is available to leak into the living space in the unit 10. Also, in view of the utilization of the heat from the engine 12 that is normally wasted, the engine 12 may be of relatively small size thereby reducing problems of noise, weight, vibration and fuel economy.

In the operation of the illustrative system as generally represented in FIG. 1, it is to be recognized that several different conditions may exist to accommodate specific demands. Specifically, the conditions may involve a wide degree of variation in the power demand of the electrical system 18 along with similar variation in the demand on the air-intake system 20, varying from the provision of considerable heat to the provision of considerable cold. As disclosed in detail below, the system hereof accommodates these variable demands with convenience and economy. In one operating embodiment of the present invention, the engine 12 is rated at 3½ horse power and is capable of providing in excess of 1 kilowatt of electrical power, and in excess of 1 ton of air conditioning or in the alternative, well in excess of 10,000 BTU/hour of space heating. Fuel consumption, depending upon various conditions, may be well below ⅓ gallon of gasoline per hour of operation.

Considering the system of FIG. 1 in somewhat greater detail, reference will now be made to FIG. 2 wherein previously-identified components bear similar reference numerals. The engine 12, as suggested above, may comprise a relatively-small internal-combustion unit incorporating a carburetion system (not shown in detail) which is supplied with fuel through a duct 22 and air through a passage 24. The engine 12 also incorporates a control 26, as well known in the prior art, for responding to the power demands of the generator 14 and a pump 25. Specifically, the engine 12 is mechanically coupled to the generator 14 as indicated by a dashed line 27 and is similarly connected to the pump 25 as indicated by a dashed line 28. The load applied to the engine 12 as a result of these two mechanical connections determines the fuel supplied to the engine 22 by reason of the operation of the fuel control 26 as well known in the prior art. Specifically, the fuel control system 26 may incorporate various forms of governors or other structures as very well known in the prior art.

The generator 14 supplies electrical energy to a pair of lines 30 and 32 which are connected to: the heat-powered refrigeration unit 16, the electrical system 18 and to the stationary terminals of a double pole reversing switch 34. Although not shown in detail, the generator 14 may also be connected to a battery, as well known in the art to function as a starter for the engine 12. Such structure is somewhat ancillary to the present invention, and as is indicated, is very well known in the prior art, consequently is not deemed appropriate for treatment herein.

The use of electrical energy from the generator 14 in the refrigeration unit 16 will be considered in detail below; however, it is to be understood that the major portion of the energy for the unit 16 is drawn from the engine 12 in the form of heat energy and not electrical energy. The electrical energy supplied to the electrical system 18 may be employed in a variety of appliances or apparatus, as indicated above. Finally, the electrical energy supplied to the switch 34 serves to actuate a motor-driven blower 36 which is a component of the air-intake system 20 as considered with reference to FIG. 1. Essentially, the air-intake system 20 is associated with the passage 38 defined in the roof 40 of the unit 10 (FIG. 1). The blower 36 (FIG. 2) as described in detail below may be employed to move air through the passage 38 in either direction.

As indicated above, air is supplied at ambient to the engine 12 through an intake passage 24 and is combined with fuel, detonated then exhausted through an exhaust passage 44 with the result that the passage 44 attains relatively high operating temperatures, e.g. over 400° F. The passage 44 extends through a heat exchanger 46 and a muffler 48. These structures may take any of a variety of well known forms. The heat exchanger 46 transfers heat from the combustion products flowing through the passage 44 to a fluid that circulates in a heat-transfer circuit 50 (generally indicated). Specifically, in the illustrated mode, the heat-transfer fluid in the circuit 50 passes from the heat exchanger 46 through the pump 25, a temperature-responsive throttle valve 52 and a two-way valve 54 to enter the refrigeration unit 16. The circuit 50 between the unit 16 and the heat exchanger 46 is closed by a duct 56. A refrigerant line 60, from the unit 16 supplies refrigerant (for cooling) through a expansion valve 62 and a cooling coil 64, to be returned through a line 65. In an alternate mode, the two-way valve 54 permits the throttle valve 52 to be connected through a line 57 to a heating coil 59, with return to the heat exchanger 46 through a line 58. In accordance with the operation of the unit, either the heating coil 59 or the cooling coil 64 (or neither) may be operative to accomplish the desired temperature within the space of concern.

In view of the above structural description of the system, a full understanding thereof may now be accomplished by assuming certain specific conditions and explaining the attendant operation. Accordingly, assume initially a situation in which the electrical system 18 requires a significant amount of power and it is also desirable to provide substantial cool air to the space of concern. Under such circumstances, the switch 34 is set to actuate the blower 36 to force air into the space of concern, i.e. downwardly through the passage 38. Furthermore, the two-way valve 54 is set in the position, as illustrated, connecting the throttle valve 52 to the unit 16.

Under the circumstances, the fuel consumption of the engine 12 is substantial to accommodate the load provided by the generator 14. As a consequence, heat from the engine 12 is also abundant with the result that the heat-transfer fluid in the circuit 50 supplies substantial heat to the unit 16 at an elevated temperature. Consequently, the temperature-responsive throttle valve 52 is fully open with the result that load on the engine 12 imposed by the pump 25 is very small. Under these conditions, the primary mechanical power from the engine 12 is supplied as electrical energy to the electrical system 18. The primary heat energy from the engine 12 is supplied to the heat-powered refrigeration unit 16 which in turn functions to supply coolant through the coil 64 to cool air that is drawn through the passage 38 thereby accomplishing operations in accordance with the assumed conditions.

Next, assume that the load on the electrical system 18 is at a very low level, however, the demand for cooling continues. Under such circumstances, the generator 14 imposes very little load upon the engine 12 with the result that relatively little fuel is consumed by the engine 12. As a consequence, a substantial reduction occurs in the heat flowing out of the passage 44. That change in turn results in a reduction of the heat supplied from the heat exchanger 46 to the refrigeration unit 16 through the circuit 50. In the absence of additional control, the cooling effect of the air conditioner would then be substantially reduced. Accordingly, by closing a switch 71 to energize a resistance heater 73, effective operation continues. In various applications of the system, the heater 73 may serve various functions, as to heat water for culinary use. Also, the switch 71 may be replaced or supplemented by a control unit whereby electrical energy is supplied only as desired to increase the fuel consumption of the engine 12 to thereby increase the available heat. Such control is somewhat as described below with reference to an alternate structure for modulating the operation in accordance with demand. In the present system, the reduction in temperature of the heat-transfer fluid in the circuit 50 is sensed by the temperature-responsive throttle valve 52 thereby closing the orifice of the valve to significantly increase the load on the pump 25. AS a consequence, not only is the temperature of the heat-transfer fluid increased by working, but additionally, the load on the engine 12 is increased with the result that fuel consumption increases, thereby increasing the heat available in the passage 44 and in turn increasing the heat for delivery to the refrigeration unit 16. Thus, the engine 16 is modulated both by the electrical load and the need for cooling.

To consider still another situation, assume that the electrical system 18 imposes a relatively heavy load while ambient temperatures are such that neither heating nor cooling is desired from the air-conditioning apparatus. In such a situation, the reversing switch 34 is actuated to reverse the blower 36 so that air is drawn upward through the passage 38, simply venting the space of concern. Accordingly, neither heat nor cold is supplied to that space. During such operation, the valve 54 will normally be displaced from the illustrated position so as to dissipate heat from the coil 59. As a consequence, the heat-powered refrigeration unit is rendered inoperative while the heat from the engine 12 is transferred to the convenient disposal location of the passage 38 to exit with venting air.

With the valve 54 in the altered position, the system may also function as a space heater simply by setting the reversing switch 34 so that the blower 36 forces air downwardly through the passage 38. In such a situation, control is again accomplished by the combination of the generator 14 and the pump 25. That is, the utilization of the engine 12 both as a burner for heat and as a source of mechanical or rotary energy is effectively controlled to independently supply the demands of either form of power.

Figure 2:
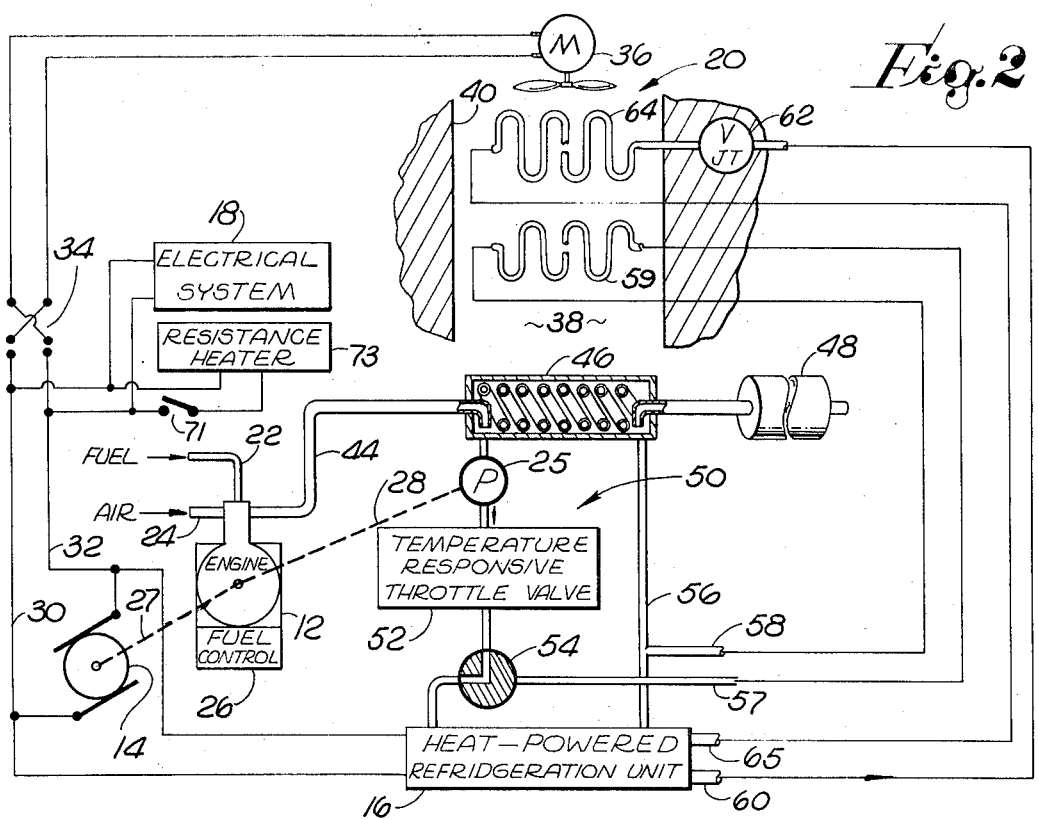
FIG. 2 is a detailed schematic view of the system represented in FIG. 1.

In summary, it may be seen that the system of FIG. 2 may be constructed to automatically supply the demand of an electrical load as well as the demand for either: internal space cooling, internal space heating, or internal space venting. It is to be appreciated that various control niceties may be incorporated as well known in the prior art; however, such features of detail control will be readily apparent to persons skilled in the art.

Generally, the heat-powered refrigeration unit may comprise an absorption unit as well known in the prior art. However, alternatively, in an exemplary embodiment hereof, a power-cycle refrigeration-cycle system has been found quite useful as will now be disclosed in detail.

Figure 3:
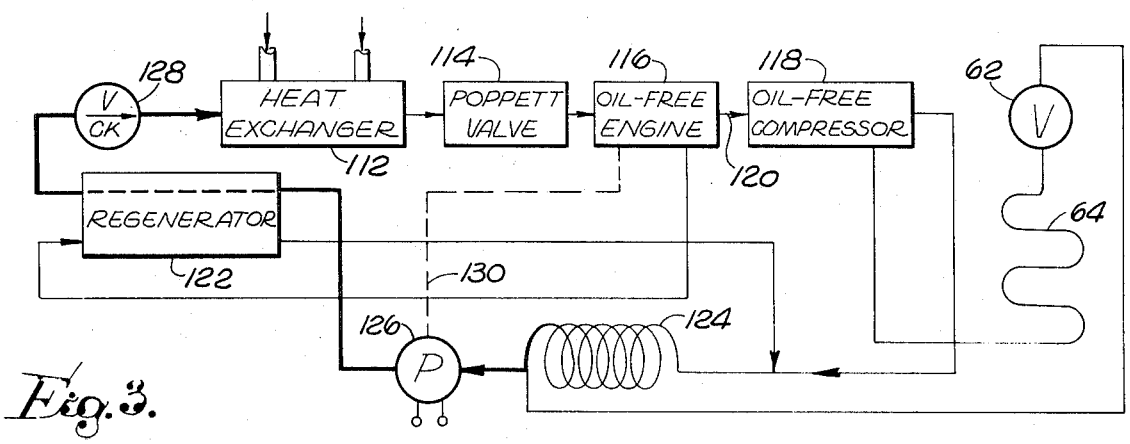
FIG. 3 is a more detailed schematic view of a portion of the system illustrated in FIG. 2.

Referring to FIG. 3, a power-cycle, refrigeration-cycle system is represented in which a single working fluid is employed for both cycles. Of course, a wide variety of different fluids may be selected; however, generally a satisfactory fluid is one which is stable at elevated temperatures, e.g. 400° F, and such a fluid has been determined to be Refrigerant No. 12. It should, however, be appreciated that a wide range of alternative fluids exist.

In the operation of the system as shown in FIG. 3, working fluid is heated in a heat exchanger 112 which receives the heat-transfer fluid from the circuit 50 (FIG. 2). That is, the heat-transfer fluid heats the working fluid of the system of FIG. 3 in the heat exchanger 112, after which the working fluid is supplied through a poppet valve 114 to drive an engine 116, which in turn mechanically actuates a compressor 118. In an operating embodiment, rotary turbine structures supported on gas bearings have been determined to be successful for the engine 116 and the compressor 118. The compressor 118 is mechanically coupled to be driven by the engine 116 as indicated by a dashed line 120. In general, the engine 116 is actuated by heat-charged working fluid while the compressor 118 acts upon the same fluid to accomplish the refrigeration cycle.

Considering the system in somewhat greater detail, the engine 116 discharges spent working fluid through a heat exchanger or regenerator 122, to a condenser 124. The condenser 124 returns the working fluid to a liquid state (indicated by a heavier flow line in FIG. 3) which is then supplied to a pump 126 for delivering the fluid to the boiler 112 under pressure through the regenerator 122 and a check valve 128. The pump 126 is connected to be driven by electrical energy, i.e. from the generator 14 (FIG. 2). Alternatively, for example, the engine 116 may drive the pump 126.

The refrigerant or working fluid is supplied in a liquid state to the pump 126 at a pressure approximately 150 psi in one operating embodiment and a temperature of 100° F. The pump 126 pressurizes the fluid which also receives some heat in the regenerator 122 and additional heat in the heat exchanger 112 after passing through the check valve 128. Consequently, the fluid emerges from the heat exchanger 112 in a gaseous state, having a temperature of approximately 450° F and a pressure 1000 psi, again relating to the illustrative embodiment.

The fluid in a gaseous high-pressure state is then spent to actuate engine 116. The spent fluid from the engine 116 is then passed through the regenerator 112 (to remove further heat) and returned to the condenser 124 at a temperature of approximately 140° F and a pressure of 150 psi. Thus, the working fluid drives the engine 116, utilizing heat energy received in the heat exchanger 112.

The engine 116, as indicated above, actuates the compressor 118 as the dynamic unit in the refrigeration aspect of the system. Specifically, a compressor 118 receives gaseous fluid from the coil 64 having a temperature of some 28° F and a pressure of approximately 40 psi. The compressor 118 then supplies the fluid to the condenser 124 at a compatible pressure, with the fluid received from the regenerator 122 (150 psi, 140° F) as indicated above. That is, the compressor increases the pressure of the received fluid to a level that is compatible with the fluid received from the regenerator 122. The condenser 124 cools the fluid received (from both the regenerator 122 and the compressor 118) reducing it to a liquid state which is: returned to the evaporator 64 through the expansion valve 62 (also shown in FIG. 2) then supplied to the boiler 112 through the pump 126 and the check valve 128. Thus, a single working fluid serves both the power aspect or cycle and the refrigeration aspect or cycle, and heat provided to the system is effectively converted to refrigeration. In accordance with well known techniques, the evaporation or cooling coil 64 may be positioned variously as indicated in the structure of FIG. 2.

In view of the above considerations, it will be apparent that the system hereof may be effectively operated in cooperation with any space which is to be environmentally adapted for human habitation. Generally, the system may be varied widely within concepts disclosed herein and consequently, the scope hereof shall be as defined by the claims set forth below.

What is claimed is:

1. An integrated energy conversion system comprising:
   a fuel combustion heat engine;
   an electrical generator means coupled to be driven by said engine;
   a heat-powered temperature-changing means;
   heat transfer means including fluid displacement means, for transferring heat from said engine to said temperature changing means;
   means for drivingly connecting said engine to said fluid displacement means; and
   control means for supplying fuel to said engine responsive to the loads of said generator means and said fluid displacement means.

2. An energy conversion system according to claim 1 wherein said control means includes means responsive to the temperature of said heat transfer means to vary the load on said fluid displacement means.

3. An energy conversion system according to claim 1 wherein said heat engine comprises an internal combustion engine.

4. An energy conversion system according to claim 1 wherein said temperature-changing means comprises a power-cycle, refrigeration-cycle system.

5. An energy conversion system according to claim 1 wherein said electrical generator means supplies energy to said refrigeration system.

6. An energy conversion system according to claim 1 wherein said temperature-changing means comprises a heater.

7. An energy conversion system according to claim 1 wherein said temperature-changing means comprises a refrigeration system.

8. An energy conversion system according to claim 1 wherein said control means includes means for increasing the fuel consumption of said heat engine responsive to the demand of said temperature-changing means at a time when the demand of said generator is relatively low by increasing the load on said fluid displacement means.

9. An energy conversion system according to claim 8 wherein said fluid displacement means comprises a pump means and said control means includes a temperature-responsive throttle valve.

* * * * *